United States Patent
Fang

(10) Patent No.: US 7,027,524 B2
(45) Date of Patent: Apr. 11, 2006

(54) METHOD OF TRANSMITTING AND RECEIVING QPSK DIGITAL SIGNALS

(75) Inventor: Juing Fang, Cupertino, CA (US)

(73) Assignee: Alcatel, Paris (FR)

( * ) Notice: Subject to any disclaimer, the term of this patent is extended or adjusted under 35 U.S.C. 154(b) by 773 days.

(21) Appl. No.: 10/043,111

(22) Filed: Jan. 14, 2002

(65) Prior Publication Data

US 2002/0133644 A1    Sep. 19, 2002

(30) Foreign Application Priority Data

Jan. 15, 2001    (FR) .................................. 01 00464

(51) Int. Cl.
*H03C 1/52*      (2006.01)
*H03K 7/06*     (2006.01)

(52) U.S. Cl. ..................... 375/303; 375/308

(58) Field of Classification Search ............... 375/308, 375/298, 260, 261, 283, 286, 279, 295, 316
See application file for complete search history.

(56) References Cited

U.S. PATENT DOCUMENTS

| | | | | |
|---|---|---|---|---|
| 4,660,214 A | * | 4/1987 | Pahlavan et al. | ............ 375/262 |
| 5,621,761 A | * | 4/1997 | Heegard | ...................... 375/265 |
| 5,692,007 A | * | 11/1997 | Durrant et al. | ............. 375/142 |
| 5,966,412 A | * | 10/1999 | Ramaswamy | ................ 375/341 |
| 6,185,259 B1 | * | 2/2001 | Dent | ........................... 375/261 |
| 6,470,055 B1 | * | 10/2002 | Feher | .......................... 375/259 |

FOREIGN PATENT DOCUMENTS

| | | |
|---|---|---|
| EP | 0 716 529 A2 | 6/1996 |
| EP | 0 780 987 A1 | 6/1997 |

OTHER PUBLICATIONS

Cavalec-Amis K et al: "Block turbo codes for space-time systems", Globecom '00—IEEE. Global Telecommunications Conference, Nov. 27, 2000-Dec. 1, 2000, pp. 1021-1025, vol. 2, Piscataway, NJ, USA.

Sandeep Rajpal et al: "Product Coded Modulation" Proceedings of the Global Telecommunications Conference (Globecom), Nov. 29, 1993-Dec. 2, 1993, pp. 7-11, vol. 4, New York, USA.

* cited by examiner

*Primary Examiner*—Jean Corrielus
*Assistant Examiner*—Qutub Ghulamali
(74) *Attorney, Agent, or Firm*—Sughrue Mion, PLLC

(57) ABSTRACT

A method of transmitting QPSK digital signals in which each 2-digit binary number, referred to as a symbol, is assigned a phase of a carrier, and symbols are added to enable error correction at the receiver. The error correction code is a product code. To obtain transparency to phase rotations, the I bits ($I_1$, $I_3$, etc.) and the Q bits ($Q_2$, $Q_4$, etc.) of a symbol to be transmitted are placed in different rows but in the same column, so that each row contains only one type of bit, I or Q. The error correction coding is effected: row by row ($N_C$-$K_C$), and by pairs of adjacent columns, and the code I (or Q) bits of two associated adjacent columns are deduced from the I (or Q) bits of the two columns.

12 Claims, 3 Drawing Sheets

METHOD OF TRANSMITTING AND RECEIVING QPSK DIGITAL SIGNALS

The invention relates to a method of transmitting QPSK and QAM-16 digital signals.

BACKGROUND OF THE INVENTION

The form of modulation known as QPSK (short for "quaterny phase-shift keying") is routinely used to transmit digital signals and represents a pair of binary digits by the phase of a sinusoidal signal relative to a reference phase.

Because a 2-digit binary number can take four values, the phases can differ by $\pi/2$ radians. For example, a signal having a phase shift of $\pi/4$ radians relative to the reference phase represents the number 00. A signal with a phase shift of $3\pi/4$ relative to the reference phase represents the number 01, a signal with a phase shift of $5\pi/4$ relative to the reference phase represents the number 11, and a signal with a phase shift of $7\pi/4$ relative to the reference phase represents the number 10. This kind of correspondence between the pairs of binary digits and the phase shifts, in which only one binary digit is modified for each increment of $\pi/2$, is referred as the Gray correspondence. Other forms of correspondence are possible, for example the natural correspondence with increasing values of the numbers, in which case the succession of binary numbers is 00, 01, 10 and 11.

The receiver must know the reference phase; in other words, it must be possible to distinguish between the four phase values transmitted, for example $\pi/4$, $3\pi/4$, $5\pi/4$ and $7\pi/4$ or $0$, $\pi/2$, $\pi$ and $3\pi/2$. The simplest way to recover the reference phase, i.e. to resolve the phase ambiguity, is to send periodically a known symbol, i.e. a symbol consisting of bits of predetermined value. The disadvantage of this method is that it cannot correct errors due to transmission noise, which is inevitable, and a consequence of this is the appearance of phase jumps between successive transmissions of the known symbols.

Another, relatively complex, method detects decoding errors and commands phase rotations by increments of $+\pi/4$ in order to determine which is the correct phase. This requires considerable processing time, which is incompatible with real-time packet transmission, because the processing time leads to loss of data.

The method providing the best results entails assigning the transmitted data an error correcting code and correcting errors after decoding, rather than simultaneously with transmission, as in the prior art methods.

The most effective error correcting codes are product codes, which are also known as turbo codes. To form a product code, the binary digits to be transmitted are assembled into a matrix which has L rows and C columns and the rows and columns are coded in blocks; in other words, (K-C) error correcting bits (parity bits) are added to each row containing C data bits and (P-L) error correcting bits are added to each column containing L data bits. If a row is completely erroneous, its parity bits cannot be used to correct it; on the other hand, the erroneous row could be corrected by means of the parity bits in the columns, because only one bit is erroneous in each column.

However, existing turbo codes cannot be used for QPSK because phase rotations affect decoding. In other words, existing error correcting turbo codes are not transparent to phase rotations, and therefore cannot be used for QPSK transmission.

OBJECTS AND SUMMARY OF THE INVENTION

The invention provides, for QPSK signals, error correcting turbo codes (product codes) which are insensitive to phase rotations. The invention therefore provides a turbo code for QPSK modulation that is transparent to phase rotations.

In a first embodiment of the invention, for coding, the I and Q bits of a QPSK symbol to be transmitted are placed in different rows but in the same column, so that each row contains only one type of bit (I or Q), the coding for error correction is affected, on the one hand, row by row and, on the other hand, by pairs of adjacent columns, the code I bits of two associated adjacent columns are deduced from the I bits in said two columns and the code Q bits of the associated two adjacent columns are deduced from the Q bits in said two columns, the code bits are arranged in the same manner as the starting bits, i.e. so that each row contains only one type of bit (I or Q), and the pairs of adjacent code I and Q bits in the same column are transmitted like the other QPSK symbols.

With this type of coding, and if Gray symbols are used, for example, a rotation of $\pi$ inverts the bits (a 1 bit becomes a 0 bit and a 0 bit becomes a 1 bit). Thus the matrix remains in the same family of rows and columns, which enables errors to be corrected in a manner known to the person skilled in the art.

If a rotation of $\pi/2$ occurs, the I rows become Q rows and the Q rows become inverted I rows. The row and column words obtained in this way with a rotation of $\pi/2$ respectively remain in the row and column codes, which means that they can be decoded correctly. Similarly, it can be shown that a rotation of $3\pi/2$ causes the I rows to become inverted Q rows and the Q rows to become I rows. Under these conditions, the row and column words can be decoded correctly.

Accordingly, in the case of QPSK Gray symbols, the first coding mode is transparent to rotations of $\pi$, $\pi/2$ and $3\pi/2$, i.e. to all rotations. This shows that this type of coding has the same properties for a natural succession of QPSK symbols. The coding is therefore totally transparent to the phase rotations, which thus enables correct decoding.

In a second embodiment of the invention, to code the symbols to be transmitted, the I and Q bits of a QPSK symbol are both placed in the same row, so that each of the rows is formed of pairs of I and Q bits; the rows and the columns are arranged so that the I and Q bits alternate in each column, the rows and the columns are coded by adjacent pairs so that the code I bits are derived from the I bits of two associated adjacent rows (columns) and the code Q bits of said two adjacent rows (columns) are derived only from the Q bits of said two rows (columns), the code bits are arranged like the starting bits, and the pairs of code I and Q bits on each rows are transmitted like the other QPSK symbols.

With this second embodiment, with a rotation of $\pi$ radians of symbols in a Gray or natural succession, the I bits and the Q bits are simply inverted and the row and column codes thus remain the same, and can therefore be decoded.

A rotation of $\pi/2$ causes the I rows to become Q rows and the Q rows to become inverted I rows. As a general rule, it can be shown that in this second embodiment the turbo coding is transparent to phase rotations for QPSK symbols.

The error correcting codes according to the invention are used to transmit signals. The invention also relates to a method of receiving signals coded using the error correcting codes described above and decoded to recover the starting symbols.

The coding of QPSK symbols in a manner that is transparent to phase rotations can be used for turbo coding QAM-16 (16 state quadrature amplitude modulation) symbols, constituting a further aspect of the invention which can be used independently of other aspects of the invention.

QAM-16 modulation transmits each of the sixteen 4-bit numbers with a specific phase and a specific amplitude of a carrier of given frequency. Thus, using the conventional representation in the complex plane, four points in each quadrant are distinguished by their position, i.e. by their phase and/or their amplitude, and each of the four points represents a 4-digit binary number.

According to the invention, the four QAM-16 symbols in each quadrant of the complex plane are arranged so that the binary numbers have the same last two digits and so that the first two digits form different numbers: 00, 01, 11 and 10, and those numbers are arranged in four subsets occupying the whole of the complex plane, each subset is formed by the set of numbers having the same first two binary digits, and therefore lying in a different one of the four quadrants, and the coordinates of the symbols in the complex plane are chosen so that after a rotation of $\pi/2$ each subset takes the place of another subset.

A set of QAM-16 symbols of this kind is product coded by coding pairs of bits of each QAM-16 symbol, each such pair forming a QPSK symbol, the QPSK symbols are coded in a manner that is transparent to phase rotations, and the data coded in this way is transmitted with the above arrangement in the complex plane.

As an alternative to this, a set of QAM-16 symbols of this kind can be coded bit by bit using a conventional BPSK (binary phase shift keying) code transparent to phase rotations.

QAM-16 modulation can be used to transmit data. The invention also relates to receiving data modulated in the manner defined above, demodulation consisting of recovering the starting symbols from the phases and the amplitudes of the received signals.

BRIEF DESCRIPTION OF THE DRAWINGS

Other features and advantages of the invention will become apparent in the course of the following description of embodiments of the invention, which is given with reference to the accompanying drawings, in which.

MORE DETAILED DESCRIPTION

To transmit binary data, QPSK modulation transmits a carrier of particular frequency and particular amplitude and assigns the phase of the carrier four different values relative to a reference phase. In the complex plane shown in FIG. 2, two successive phases are separated by an angular offset of $\pi/2$ radians. The first phase is in the first quadrant, the second phase is in the second quadrant, the third phase is in the third quadrant, and the fourth phase is in the fourth quadrant. For example, relative to the reference phase, the first phase is shifted by $\pi/4$ radians, the second phase by $3\pi/4$ radians, the third phase by $5\pi/4$ radians and the fourth phase by $7\pi/4$ radians. Two binary digits are associated with each phase. In a Gray correspondence or succession of the phases, and thus of the binary numbers, the latter are 00, 01, 11 and 10, in the positive direction starting from the first quadrant. It can be seen that, in this case, only one binary digit is modified on each progression by one step. In a natural representation, for which the numbers are shown in brackets in FIG. 2, the binary numbers are in the following progression: 00, 01, 10 and 11. In other words, the binary numbers corresponding to the pairs of binary digits progress naturally, in increasing order.

A pair (or, more generally, a set) of binary digits is usually referred to as a symbol.

For demodulation, it is necessary to determine the phase of the transmitted signal relative to the reference phase. This is not easy, in particular because noise causes rotations.

Modulation and demodulation are more efficient if phase differences between two consecutive symbols are transmitted instead of their phases as such. This is because, in the event of rotation, the phase difference between two consecutive symbols does not change. Furthermore, for real-time transmission, the data is transmitted with an error correcting code so that errors are corrected only at the receiver. The most efficient error correcting code is a product code (turbo code). However, it has been found that existing product codes are affected by phase rotations. The invention therefore seeks to provide a product code that is insensitive to phase rotations.

Before describing product codes according to the invention in detail, a QPSK modulator and a QPSK demodulator which can be used in the context of the invention are described.

Figure 1:
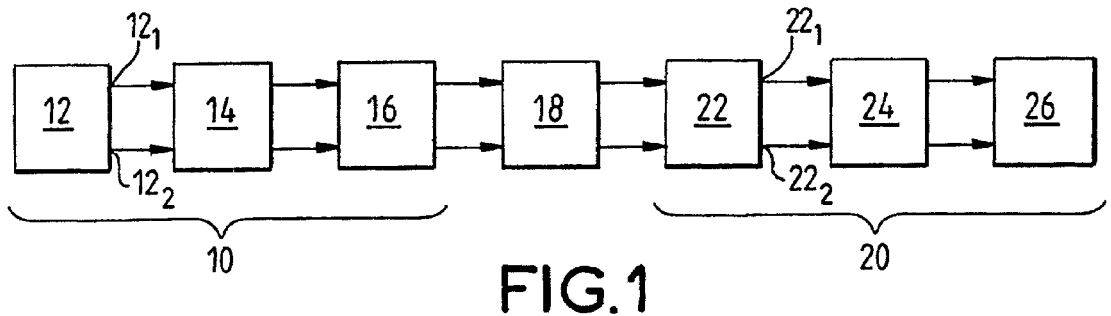
FIG. 1 is a diagram of a modulation and demodulation method using a coding method according to the invention.

The modulator 10 (FIG. 1) includes a two-dimensional differential coder 12 adapted to supply consecutive QPSK symbols. Thus a first I bit of the difference between two consecutive symbols is obtained at the first output $12_1$ of the coder 12 and a second Q bit is obtained at the second output $12_2$.

The symbols supplied by the coder 12 are applied to the inputs of a product coder 14 according to the invention, whose function is described later, in particular with reference to FIGS. 3 and 4. The coder 14 supplies a set of symbols that include, on the one hand, the symbols applied to its input and, on the other hand, supplementary symbols that are used for error correction after transmission. The symbols at the output of the coder 14 are converted by a QPSK modulator 16 into phases of carrier and the modulated signals are transmitted over a channel 18, for example a radio channel.

The receiver includes a demodulator unit 20 which includes a QPSK demodulator 22 which receives the signals from the channel and delivers at its outputs $22_1$ and $22_2$ binary symbols that are applied to the two inputs of a product code decoder 24 to determine the corresponding starting symbols at the output of the coder 12. The output symbols from the decoder 24 are applied to the input of a two-dimensional differential decoder 26 which performs the operation that is the inverse of that effected by the coder 12 and therefore supplies the starting symbols at its output.

If the demodulator 22 and the decoder 24 are not to be affected by phase rotations, it is necessary for the product code used to be transparent to rotations of $\pi/2$, $\pi$ and $3\pi/2$; in other words, this kind of rotation must transform each code word into a valid code word, i.e. one from the same family.

A first embodiment of a product code for QPSK symbols that is transparent to phase rotations will now be described with reference to Table I below and to FIG. 3.

TABLE I

| $I_{11}$ | $I_{12}$ | $I_{13}$ | $I_{14}$ |
|---|---|---|---|
| $Q_{21}$ | $Q_{22}$ | $Q_{23}$ | $Q_{24}$ |
| $I_{31}$ | $I_{32}$ | $I_{33}$ | $I_{34}$ |
| $Q_{41}$ | $Q_{42}$ | $Q_{43}$ | $Q_{44}$ |

For a set of binary digits or values, conventional product coding entails arranging the binary digits in rows and columns and adding to each row and to each column supplementary bits to be used for error correction. The row and column codes are called block codes. Because these codes are well-known to the person skilled in the art, it is not necessary to describe them in detail.

The advantage of product coding is that strongly degraded rows can be corrected. A row containing more than two erroneous bits cannot necessarily be corrected. On the other hand, if the columns are not degraded, each bit in the row can therefore be corrected using the error correcting codes from the columns. Similarly, if a column is degraded but the rows are not, the column can be corrected using the row codes.

In the example shown in Table I, I represents a first bit (for example the most significant bit) of a QPSK symbol and Q represents the second bit of the symbol. In this simplified example, two symbols ($I_{11}$, $Q_{21}$) and ($I_{12}$, $Q_{22}$) are shown at the input of the coder 14. Table I is obtained at the output of the coder 14. To this end the rows are coded conventionally with a block code and the columns are coded in pairs.

Thus row coding yields the first two rows of Table I. The coding is then effected so that the pair of bits $I_{11}$ and $I_{12}$ supplies the pair of bits $I_{31}$ and $I_{32}$ and the bits $Q_{21}$ and $Q_{22}$ supply the bits $Q_{41}$ and $Q_{42}$. Similarly, the bits $I_{33}$ and $I_{34}$ are the result of coding the bits $I_{13}$ and $I_{14}$ and the bits $Q_{23}$ and $Q_{24}$ are coded to obtain the bits $Q_{43}$ and $Q_{44}$.

This produces, in addition to the starting symbols ($I_{11}$, $Q_{21}$) and ($I_{12}$, $Q_{22}$), six other symbols, namely the symbols ($I_{13}$, $Q_{23}$), ($I_{14}$, $Q_{24}$), ($I_{31}$, $Q_{41}$), ($I_{32}$, $Q_{42}$), ($I_{33}$, $Q_{43}$) and ($I_{34}$, $Q_{44}$) All these symbols are therefore transmitted by the channel 18.

Figure 3:
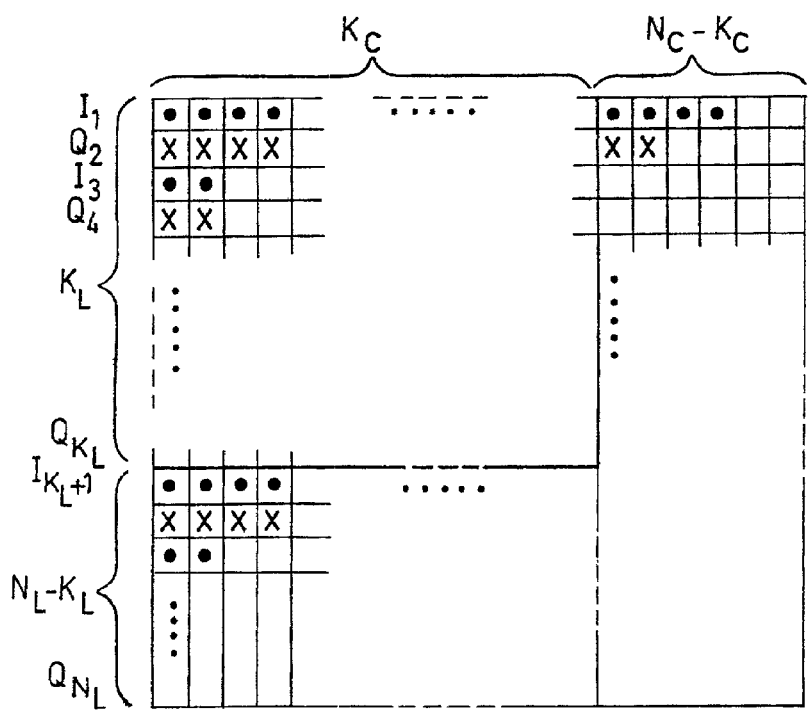
FIG. 3 is a diagram explaining a first coding method according to the invention.

More generally, as shown in FIG. 3, if $K_L$ rows and $K_C$ columns are provided at the outset, $N_L$-$K_L$ rows and $N_C$-$K_C$ columns are added. The coding is first effected conventionally by rows, i.e. supplementary bits are added to each row.

Column coding is effected in the following manner: the first two columns are considered first, and in those columns the I bits in the odd-numbered rows ($I_{11}$, $I_{12}$, $I_{31}$, $I_{32}$, etc.). From these I bits, I values are determined and placed in the odd-numbered rows among the $N_L$-$K_L$ supplementary rows.

Similarly, supplementary pairs of Q bits are determined from the Q values in the even-numbered rows ($Q_{21}$, $Q_{22}$, $Q_{41}$, $Q_{42}$, etc.) and placed in the even-numbered rows among the $N_L$-$K_L$ supplementary rows.

The same procedure is then followed with the third and fourth columns, the fifth and sixth columns, and so on; in each pair of columns, all the I bits (i.e. all the symbols of the odd-numbered rows) are considered as a single column and the error correcting bits to be added are deduced from them and placed in the odd-numbered rows of the supplementary rows $N_L$-$K_L$ of each double column.

Similarly, all the Q bits in the even-numbered rows of each pair of columns are considered as a single column, to which are added error correction bits placed in pairs in the even-numbered rows among the $N_L$-$K_L$ supplementary rows.

Of course, the I bits supply I bits and the Q bits supply Q bits. A symbol transmitted by the channel consists of a pair of bits consisting of an I bit and the next Q bit in the same column.

Calculation shows that this type of product code is transparent to rotations of $\pi$, $\pi/2$, $3\pi/2$ and $-\pi/2$. Consider first the Gray succession 00, 01, 11, 10.

Figure 2:
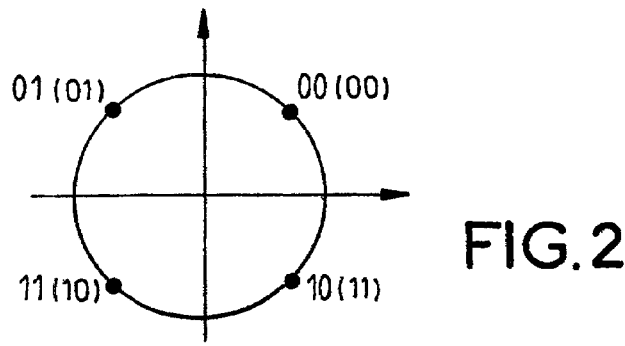
FIG. 2 is a diagram showing QPSK modulation.

FIG. 2 shows that a rotation of n gives rise to the following transformations of the I and Q symbols:

$$I'=I\oplus 1=\bar{I}$$

$$Q'=Q\oplus 1=\bar{Q} \quad (1)$$

Under these conditions, the row and column code values remain the same and the product code is therefore transparent to a rotation of $\pi$.

A rotation of $\pi/2$ yields:

$$I'=Q$$

$$Q'=I\oplus 1=\bar{I} \quad (2)$$

It can therefore be seen that, with a rotation of $\pi/2$, the I rows are replaced by Q rows and the Q rows are replaced by inverted I rows. The rows are decoded correctly. Similarly, in the columns, the fact that an I row becomes a Q row and vice-versa means that after the rotation of $\pi/2$ the column code remains the same. Thus the product code described above is transparent to a rotation of $\pi/2$.

A rotation of $3\pi/2$ corresponds to the following transformations:

$$I'=Q\oplus 1=\bar{Q}$$

$$Q'=I \quad (3)$$

Thus the I rows are replaced by inverted Q rows and the Q rows are replaced by I rows. The rows are decoded correctly and, as in the case of a rotation of $\pi/2$, it can be seen that a rotation of $3\pi/2$ means that a column code remains the same. The product code described above is therefore also transparent to a phase rotation of $3\pi/2$.

The product code shown in FIG. 3 is therefore transparent to phase rotations.

In the case of a natural succession of QPSK symbols, a rotation of $\pi$ radians yields to the following equations:

$$I'=I\oplus 1=\bar{I}$$

$$Q'=Q \quad (4)$$

A rotation of $\pi/2$ radians yields the equations:

$$I'=I\oplus Q$$

$$Q'=Q\oplus 1=\bar{Q} \quad (5)$$

A rotation of $3\pi/2$ radians yields the equations:

$$I'=I\oplus Q\oplus 1$$

$$Q'=Q\oplus 1=\bar{Q} \quad (6)$$

Because the Q bits are coded by the same row or column code, and because the code is linear, the code is transparent to rotations of $\pi$, $\pi/2$ and $3\pi/2$.

A second type of product code for QPSK symbols which is transparent to phase rotations will now be described with reference to FIG. 4.

As with the first embodiment, a simple example represented in Table II below is explained first.

TABLE II

| $I_{11}$ | $Q_{12}$ | $I_{13}$ | $Q_{14}$ |
|---|---|---|---|
| $Q_{21}$ | $I_{22}$ | $Q_{23}$ | $I_{24}$ |
| $I_{31}$ | $Q_{32}$ | $I_{33}$ | $Q_{34}$ |
| $Q_{41}$ | $I_{42}$ | $Q_{43}$ | $I_{44}$ |

This example starts with two QPSK symbols ($I_{11}$, $Q_{12}$) and ($Q_{21}$, $I_{22}$) which are placed in two separate rows, one in the natural order and the other in the reverse order, as shown; in other words $Q_{21}$ is in the same column as $I_{11}$ and $I_{22}$ is in the same column as $Q_{12}$.

The I bits in the first and second rows are then coded as if they were in the same row. They therefore supply the bits $I_{13}$ and $I_{24}$ which are placed on the first and second rows, at the $3^{rd}$ position (i.e. in the $3^{rd}$ column) on row 1 (bit $I_{13}$) and in the $4^{th}$ position ($4^{th}$ column) on row 2 (bit $I_{24}$).

Similarly, the bits $Q_{12}$ and $Q_{21}$ are coded as if they were on the same row and supply the bits $Q_{14}$ and $Q_{23}$ which are also placed on rows 1 and 2, respectively in the $4^{th}$ position (for $Q_{14}$) and the $3^{rd}$ position (for $Q_{23}$).

It can thus be seen that the bits $I_{13}$ and $Q_{14}$ are in row 1 with the same succession IQ as the bits $I_{11}$ and $Q_{12}$ and, similarly, the bits $Q_{23}$ and $I_{24}$ are on row 2 with the same succession QI as the bits $Q_{21}$ and $I_{22}$.

The columns are coded in the same way, i.e. considering the bits $I_{11}$ and $I_{22}$ forming part of the first and second columns that are coded together. They supply the bits $I_{31}$ and $I_{42}$ respectively placed in the first and second columns. Similarly, the bits $Q_{12}$ and $Q_{21}$ of the second and first columns supply the bits $Q_{32}$ and $Q_{41}$ respectively placed in the second and first columns.

Finally, the bits $I_{33}$ and $I_{44}$ result from the column coding of the bits $I_{13}$ and $I_{24}$ and the bits $Q_{34}$ and $Q_{43}$ result from the column coding of the Q bits$_{14}$ and $Q_{23}$.

In a different embodiment, the bits $I_{31}$ and $I_{42}$ of the $3^{rd}$ and $4^{th}$ rows supply the code bits $I_{33}$ and $I_{44}$ respectively placed in the $3^{rd}$ and $4^{th}$ rows and the bits $Q_{32}$ of the $3^{rd}$ row and $Q_{41}$ of the $4^{th}$ row supply the code bits $Q_{34}$ and $Q_{43}$ respectively placed on the $3^{rd}$ and $4^{th}$ rows.

Figure 4:
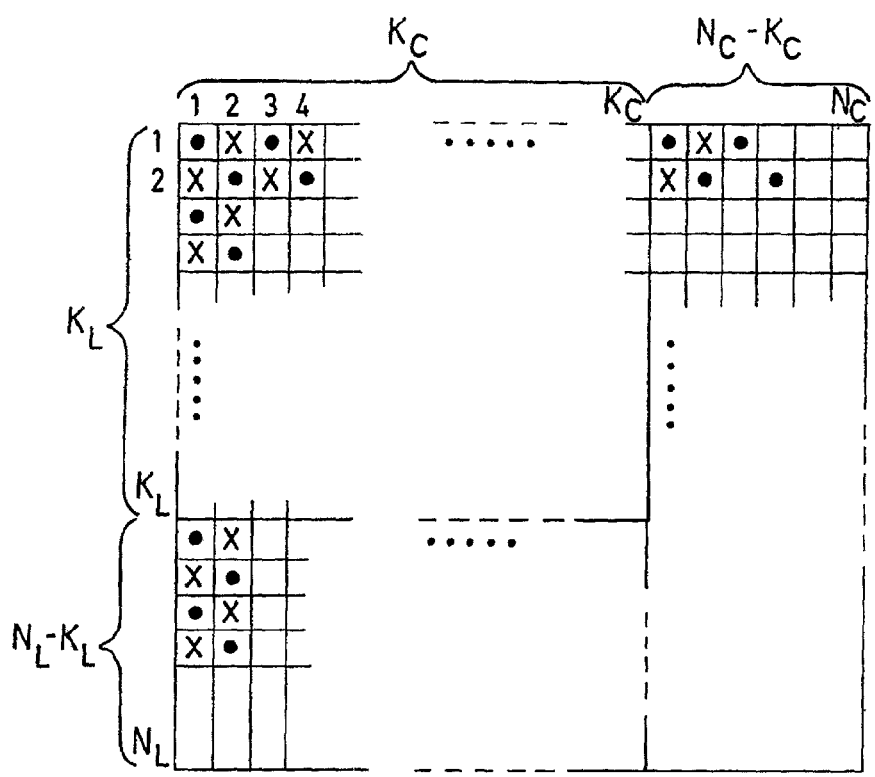
FIG. 4 is a diagram analogous to that of FIG. 3 for a different embodiment of the method.

More generally, as shown in FIG. 4, the starting point is a matrix of QPSK symbols with $K_L$ rows and $K_C$ columns. A series of symbols IQ is placed on the odd-numbered rows 1, 3, 5, etc. and an inverted series of symbols IQ, i.e. a series in which the first bit becomes the second, and vice-versa, is placed on the even-numbered rows 2, 4, 6, etc. There is therefore a QI succession in each even-numbered row.

$N_L$-$K_L$ rows of code bits and $N_C$-$K_C$ columns of code bits are added to the above matrix with $K_L$ rows and $K_C$ columns to form a matrix with $N_L$ rows and $N_C$ columns.

The code bits in the supplementary rows and columns are computed in the same manner as described with reference to Table II, in other words considering first rows 1 and 2 and, in those rows 1 and 2, all the I bits which are assigned $N_C$-$K_C$ code I bits that are arranged in the same manner as in the starting matrix, i.e. for the $(K_C+1)^{th}$ position the first I bit is placed in the first row, for the $(K_C+2)^{th}$ position the second I bit is placed in the second row, and so on. The same procedure is applied to the Q bits, i.e. the Q bits of rows 1 and 2 are assigned $N_C$-$K_C$ code Q bits, with the first placed in the second row, the second in the first row, the third in the second row, and so on.

Rows 3 and 4, rows 5 and 6, and so on are treated in the same manner.

A matrix with $N_L$ rows and $N_C$ columns is then formed from the matrix with $K_L$ rows and $N_C$ columns obtained in this way, likewise by coding the columns two by two, i.e. columns 1 and 2 are coded together, columns 3 and 4 are coded together, and so on. To be more precise, in each pair of columns, all the I bits are considered and are assigned $N_L$-$K_L$ code bits that are placed like the I bits in the same numbered columns. Thus, in the case of columns 1 and 2, the first code I bit is placed in the first column at the $(K_L+1)^{th}$ position, the second code I bit is placed in the second column at the $(K_L+2)^{th}$ position, the third code I bit is placed in the first column at the $(K_L+3)^{th}$ position, and so on. Similarly, in the first two columns, all the Q bits are considered, from which $N_L$-$K_L$ code Q bits are formed, and the $N_L$-$K_L$ code Q bits are placed in the first and second columns in the same manner as the starting Q bits, i.e. the first code Q bit is placed in the second column at the $(K_L+1)^{th}$ position, the second code Q bit is placed in the first column at the $(K^L+2)^{th}$ position, the third code Q bit is placed in the second column at the $(K_3+3)^{th}$ position, and so on.

As in the embodiment of the product code (turbo code) described with reference to FIG. 3, the product code shown in FIG. 4 is transparent to rotations of π, π/2 and 3π/2 radians. That transparency is deduced from the above equations (1), (2), (3), (4), (5) and (6).

A product code for QAM-16 modulation that is also transparent to phase rotations will now be described with reference to FIGS. 5 and 6.

QAM-16 modulation represents the sixteen 4-digit binary numbers by amplitude and phase modulation of a carrier.

Figure 5:
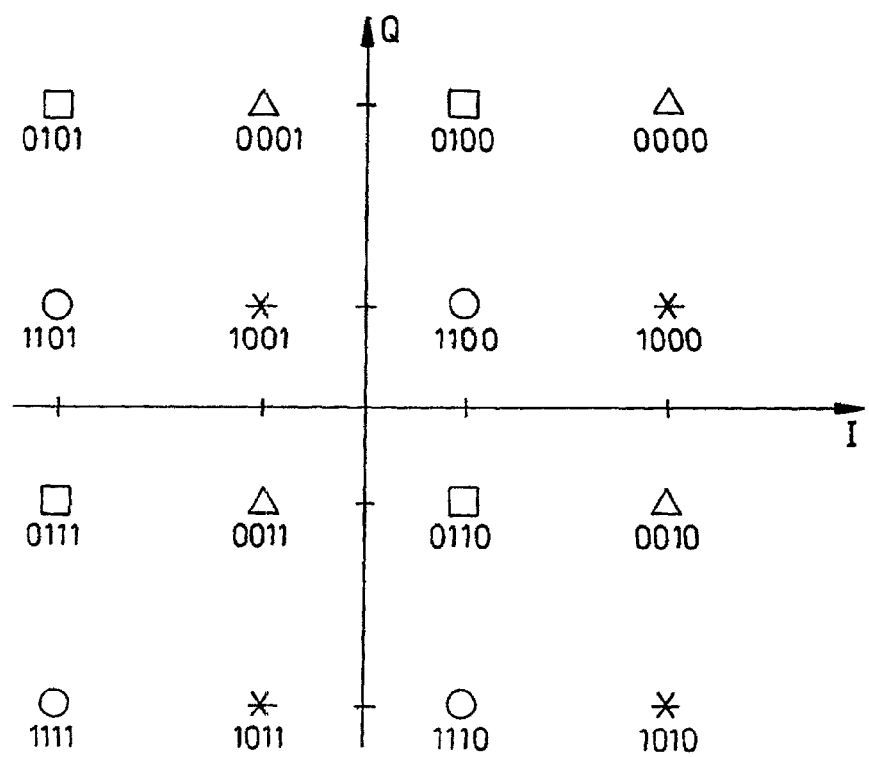
FIG. 5 is a diagram showing QAM-16 modulation in accordance with the invention.

As shown in FIG. 5, the constellation of sixteen binary numbers is represented by sixteen points in the complex plane. Each point has an abscissa of ±0.5 or ±1.5 and an ordinate of ±0.5 or ±1.5. Thus each quadrant of the complex plane includes four points. The invention consists of choosing the values assigned to each point in the complex plane so that the sixteen points are divided into four subsets each of four points, each subset having one point in each quadrant. Also, the subsets are such that a rotation of π/2 radians about the origin causes one subset to take the place of another subset.

Thus a first subset, whose points are represented by a triangle in FIG. 5, is formed by the points with the coordinates (+1.5; +1.5), (−0.5; +1.5); (−0.5; −0.5) and (+1.5; −0.5). A second subset, whose points are represented by a square in FIG. 5, is formed by the points with the coordinates (+0.5; +1.5), (−1.5; +1.5); (−1.5; −0.5) and (+0.5; −0.5). A third subset, whose points are represented by a circle in FIG. 5, is formed by the points with the coordinates (+0.5; +0.5), (−1.5; +0.5); (−1.5; −1.5) and (+0.5; −1.5). Finally, the fourth subset, whose points are represented by a star in FIG. 5, is formed by the points with the coordinates (+1.5; +0.5), (−0.5; +0.5); (−0.5; −1.5) and (+1.5; −1.5).

Thus the four points of each subset form a square and a consequence of a rotation of π/2 radians is that the first subset takes up the position of the second subset, the second subset takes up the position of the third subset, the third subset takes up the position of the fourth subset, and the fourth subset takes up the position of the first subset.

Also, the numbers in each subset are chosen so that the first two bits (the more significant bits) are the same and the last two bits (the less significant bits) form different numbers, for example numbers in a Gray succession.

Thus the first subset (whose points are marked by a triangle) has the same first two digits 00, and the succession of the last two digits, starting from the same quadrant and moving in the positive direction, is 00, 01, 11, 10. For the second subset, whose points are marked by a rectangle, the first two digits are 01; for the third subset, whose points are marked by a circle, the first two digits are 11; for the fourth subset, whose points are marked by a star, the first two digits are 10.

Note also that the last two digits in each quadrant are the same. Thus the first quadrant includes symbols belonging to the second, third and fourth subsets whose last two digits are 00. In the second quadrant the last two digits are 01; in the third quadrant the last two digits are 11; in the fourth quadrant the last two digits are 10.

A consequence of this arrangement in four subsets whereby, after a rotation of $\pm K\pi/2$ radians (where K is an integer), one subset occupies the position of another subset, is that QAM-16 data will be also be transparent to phase rotations if the words to be transmitted are assigned an error correcting code that is transparent to phase rotations, such as the product code described above for QPSK modulation.

Thus the desired result, i.e. a turbo code that is transparent to phase rotations, will be obtained if each 4-digit binary number is divided into two 2-digit binary numbers and each of those 2-digit binary numbers is assigned a turbo code transparent to phase rotations, as if each of the two numbers were to be transmitted using QPSK modulation.

As an alternative to the above, a conventional BPSK turbo code transparent to phase rotations can be used, in which error correcting coding is performed individually for each bit.

Thus, with the combination of an error correcting code assigned to each bit or to each pair of bits which is transparent to phase rotations, and the arrangement described above of 4-digit binary numbers in the complex plane, the resulting QAM-16 transmission is transparent to phase rotations, especially if a turbo code error correcting code is used.

Figure 6:
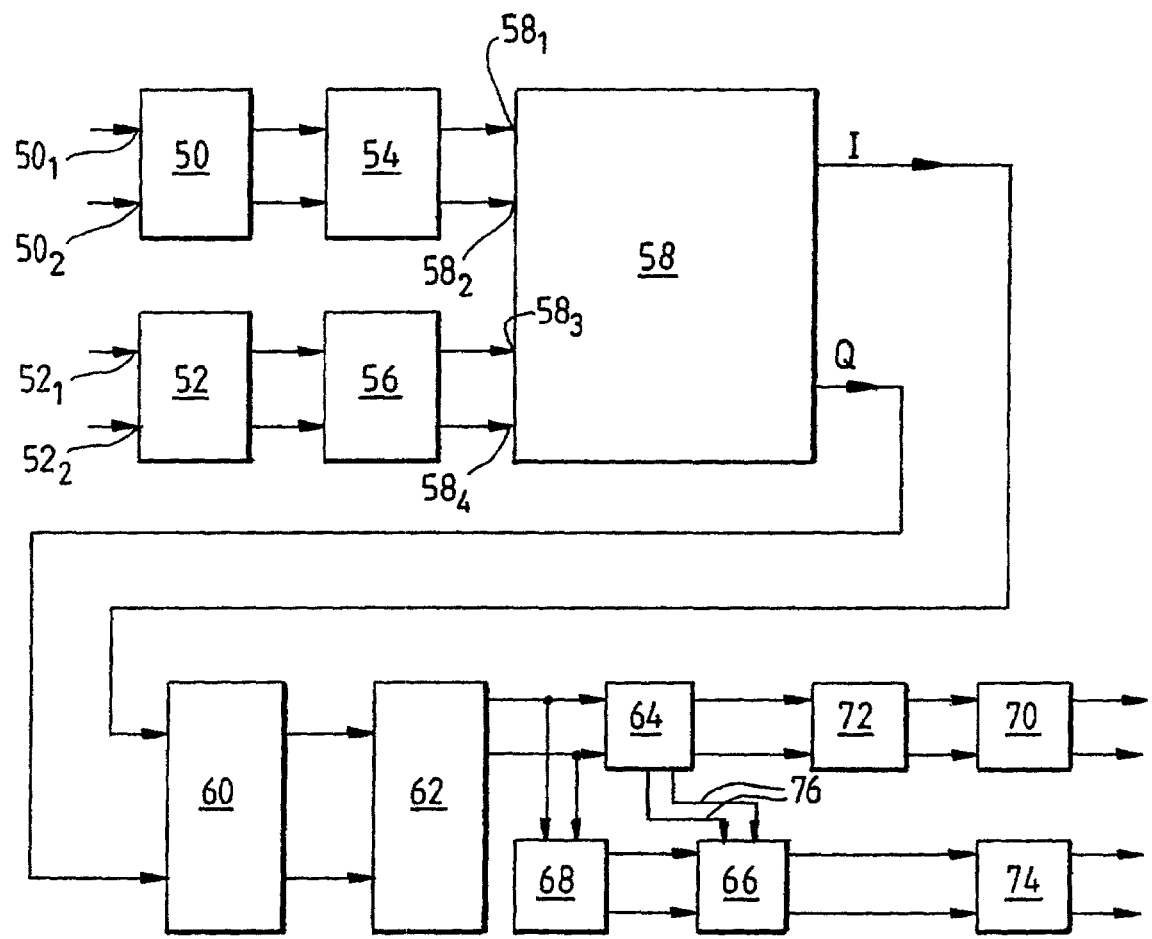
FIG. 6 is a diagram of a QAM-16 modulator according to the invention.

FIG. 6 shows a transmission system according to the invention.

The transmission system includes two 2-dimensional differential coders 50 and 52. Each of these differential coders is of the same type as the coder 12 shown in FIG. 1. The first two bits of each 4-digit binary number are applied to the two inputs $50_1$ and $50_2$ of the differential coder 50 and the last two bits of the same 4-digit number are applied to the two inputs $52_1$, $52_2$ of the differential coder 52. Each differential coder calculates the difference between two successive 2-digit numbers.

The two binary digits delivered by each of the differential coders 50, 52 are turbo coded in a manner that is transparent to phase rotations by respective coders 54 and 56. The coding effected by the coders 54 and 56 is either of the BPSK type, meaning that the coding is effected individually on each bit, or of the QPSK type, as described with reference to FIG. 3 or FIG. 4, in which the two bits are considered collectively.

The two output bits of each of the coders 54 and 56 are then applied to respective inputs $58_1$, $58_2$ and $58_3$, $58_4$ of a QAM-16 modulator 58 which arranges the 4-digit binary numbers applied to these inputs in this way in the complex plane in the manner shown in FIG. 5.

The modulated signals supplied by the modulator 58 are transmitted via a channel 60 and received by a demodulator 62 effecting an operation that is the inverse of that effected by the modulator 58, i.e. determining the symbols (4-digit binary numbers) from the phases and the amplitudes of the received signals. In this example, the demodulator 62 has two outputs $62_1$, $62_2$ which deliver digital signals, on the one hand, to a first turbo decoder 64 and, on the other hand, to a second turbo decoder 66 via a time-delay unit 68. The output signals of the first decoder 64 are transmitted to a first 2-dimensional differential decoder 70 via a second time-delay unit 72 and, in this example, the second decoder 66 transmits its output signals directly to a second 2-dimensional differential decoder 74.

The time-delay units 68 and 72 and a connection 76 between the two decoders 64 and 66 are used to synchronize the output signals of the differential decoders 70 and 74.

Note that the arrangement of the 4-digit binary numbers in QAM-16 modulation in the complex plane shown in FIG. 5 generally ensures transparency to phase rotations of $\pm K\pi/2$ (where K is an integer), provided that the error correcting codes added are also transparent to phase rotations. These error correcting codes can be either block codes, i.e. codes operating row by row, or turbo (product) codes.

What is claimed is:

1. A method of transmitting QPSK digital signals in which each 2-digit binary number, referred to as a symbol, is assigned a phase of a carrier, each of the four 2-digit binary numbers corresponds to a quadrant of the complex plane, and supplementary binary digits generated in accordance with an error correcting product code are added to a set of binary digits to enable error correction at the receiver, said method comprising the steps of:
   placing I and Q bits of a 2-digit symbol to be transmitted in different rows but in the same column, so that each row contains only one type of bit, I or Q;
   effecting the error correction coding row by row and then by pairs of adjacent columns;
   deducing the code I bits of two associated adjacent columns from the I bits of said two columns;
   deducing the code Q bits of said two associated adjacent columns from the Q bits of said columns;
   disposing said coded bits so that each row contains only one type of bit, I or Q; and
   transmitting the pairs adjacent code I and Q bits in the same column along with the 2-digit symbols to be transmitted.

2. A method according to claim 1, wherein the symbols form a natural succession or a Gray succession in a complex plane.

3. A method according to claim 1, wherein the symbols undergo differential coding before error correction coding in order to transmit the difference between two successive symbols.

4. A method according to claim 1 applied to transmitting QAM-16 digital signals, which method comprises representing a 4-digit binary number or symbol by the phase and the amplitude of a carrier and effecting error correction coding on the first two binary digits and the last two binary digits.

5. A method according to claim 4, wherein, for transmission, the sixteen 4-digit binary numbers or symbols are arranged in a complex plane so that each quadrant contains four symbols having two first digits representing different numbers and the same last two digits, said sixteen symbols are arranged in four subsets in the four quadrants of the complex plane and over the whole of the complex plane, each subset is formed by the set of numbers having the same first two binary digits, and the coordinates of the symbols in the complex plane are chosen so that after a rotation of ±Kπ/2 (where K is an integer), each subset takes the place of another subset.

6. A method of receiving QPSK digital signals transmitted by the transmission method according to claim 1, which method includes decoding that is the inverse of the error correction coding effected at the transmitter.

7. A method of transmitting QPSK digital signals in which each 2-digit binary number, referred to as a symbol, is assigned a phase of a carrier, each of the four 2-digit binary numbers corresponds to a quadrant of the complex plane, and supplementary binary digits are added to a set of binary digits to enable error correction at the receiver, wherein the error correction code is a product code, the method comprising the steps of:

placing the I bits and Q of a symbol in the same row, so that each of the rows is formed of pairs of I and Q bits;

disposing the rows and the columns so that, in each column, the I and Q bits alternate;

coding the rows and the columns by adjacent pairs so that the code I bits are derived from the I bits of two associated adjacent rows (columns);

deriving the code Q bits of said two adjacent rows (columns) only from the Q bits of said two rows (columns);

disposing the code bits so that each row contains pairs of I and Q bits; and transmitting the pairs of code I and Q bits in each row along with the 2-digit symbols to be transmitted.

8. A method according to claim 7, wherein the symbols form a natural succession or a Gray succession in a complex plane.

9. A method according to claim 7, wherein the symbols undergo differential coding before error correction coding in order to transmit the difference between two successive symbols.

10. A method according to claim 7 applied to transmitting QAM-16 digital signals, which method comprises representing a 4-digit binary number or symbol by the phase and the amplitude of a carrier and effecting error correction coding on the first two binary digits and the last two binary digits.

11. A method according to claim 10, wherein, for transmission, the sixteen 4-digit binary numbers or symbols are arranged in a complex plane so that each quadrant contains four symbols having two first digits representing different numbers and the same last two digits, said sixteen symbols are arranged in four subsets in the four quadrants of the complex plane and over the whole of the complex plane, each subset is formed by the set of numbers having the same first two binary digits, and the coordinates of the symbols in the complex plane are chosen so that after a rotation of ±Kπ/2 (where K is an integer), each subset takes the place of another subset.

12. A method of receiving QPSK digital signals transmitted by the transmission method according to claim 7, which method includes decoding that is the inverse of the error correction coding effected at the transmitter.

* * * * *